Jan. 26, 1965     D. R. WHITNEY     3,166,852
MULTIPLE ROUNDNESS GAGE

Filed Nov. 16, 1960     2 Sheets-Sheet 1

INVENTOR.
Donald R. Whitney
BY
Paul J. Ethington
ATTORNEY

Jan. 26, 1965 D. R. WHITNEY 3,166,852
MULTIPLE ROUNDNESS GAGE
Filed Nov. 16, 1960 2 Sheets-Sheet 2

INVENTOR.
Donald R. Whitney
BY
Paul J. Ethington
ATTORNEY

# United States Patent Office 3,166,852
Patented Jan. 26, 1965

3,166,852
MULTIPLE ROUNDNESS GAGE
Donald R. Whitney, Detroit, Mich., assignor to General Motors Corporation, Detroit, Mich., a corporation of Delaware
Filed Nov. 16, 1960, Ser. No. 69,637
5 Claims. (Cl. 33—174)

This invention relates to apparatus for testing circular parts and more particularly to a system for measuring qualities such as race-to-face runout in ball bearing rings.

In quality control of the production of ball bearing devices, it is necessary to check the regularity of several features of the inner and outer race rings prior to assembly. Among these features is a quantity known as race-to-face runout, a measure of the degree of precision by which the ball race of an inner or outer ring is positioned parallel to one of the ring faces. Another feature to be examined is the eccentricity of an outer diameter or inner diameter of an outer or inner ring with respect to the ball race. A third feature necessary to be determined is the "wobble" of the ring or degree of perpendicularity of an inner or outer diameter with respect to a face. It is presently proposed to provide improved apparatus for checking all of the above features, on a production basis.

In accordance with this invention, a circular part such as an inner or outer ring is held in a chuck and rotated about its axis by a suitable drive means. A plurality of displacement pickups are positioned to bear upon various points of the ring or ball race. As the part rotates a pickup bearing upon the face opposite the chuck will produce a signal having a magnitude related to the departure from parallelism of the two faces. A pair of pickups positioned to bear upon axially spaced points on the inner or outer diameter of the part will generate signals from which can be derived either a signal related to eccentricity of the diameter with respect to the race or a signal related to the perpendicularity of the diameter surface with respect to the face which engages the chuck. Another pair of displacement pickups are positioned to bear upon axially spaced points of the ball race. A function of the magnitude of the two signals generated by the latter pickups, and of the angle between the pickups, provides an output related to race-to-face runout.

Further objects and advantages of this invention are set forth in the appended claims. The invention may best be understood by the following description of illustrative embodiments, read in conjunction with the accompanying drawings, in which:

Figure 1:
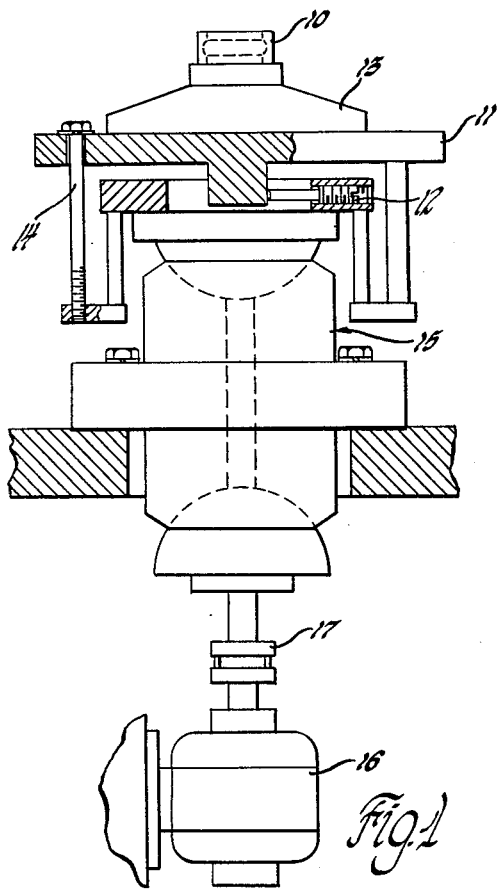
FIGURE 1 is an elevation view of a portion of the apparatus utilized in practicing this invention.

With reference to FIGURE 1, there is shown apparatus for rotating a circular part 10 about its axis. A chuck 11 is employed and this chuck may be a calibrated deflection type as disclosed in my U.S. Patent No. 2,860,882, which is assigned to the assignee of the present invention. The chuck 11 includes an adjustment means 12, providing a vernier adjustment to ensure that the center of the chuck 11 is not radially displaced with respect to the axis of rotation. The part 10 is secured to the chuck 11 by suitable means such as a low power magnetic chuck 13 having a precision ground face. Also, an adjustment means 14 is provided so that the face of the chuck 13 is precisely perpendicular to the axis of rotation of the part. The deflection chuck 11 is rotated by a precision dumbbell spindle 15 of the type disposed and claimed in my U.S. Patent No. 2,919,960. The shaft of the spindle 15 is rotated by an electric motor 16 through a flexible coupling 17 which prevents wobble of the motor shaft from being transmitted to the spindle shaft.

Figure 2:
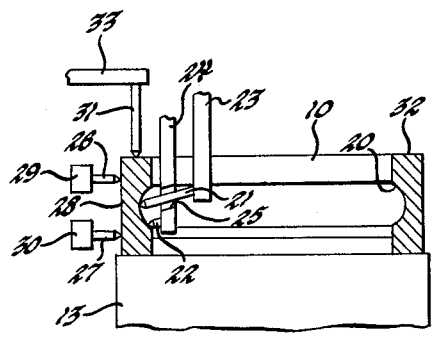
FIGURES 2 and 3 are fragmentary views, partly in section, of pickup arrangements utilized in two embodiments of the invention.

With reference to FIGURE 2, the part 10 is shown secured to the face of the magnetic chuck 13. In this case, the part 10 comprises an outer ring of a ball bearing assembly, having a ball race 20. Positioned to bear upon the race 20 are a pair of pickup styli 21 and 22. The stylus 21 is secured to a pivoted pickup arm 23 while the stylus 22 is secured to an arm 24. The arms 23, 24 transmit stylus motion to electromechanical transducer devices as hereinafter described. The stylus 21 passes through an opening 25 in the arm 24 so that the pickups may bear upon axially spaced points of the ball race, there being no arcuate displacement of the pickups. These two pickup devices produce the displacement signal necessary to provide an indication of race-to-face runout. Also, a signal obtained from the stylus 21 bearing upon the center of the race can be utilized to center the part with respect to its ball race. Another pair of pickup styli 26, 27 bear upon axially spaced points of the outer diameter 28. These styli are secured to a pair of pivoted arms 29 and 30 which in turn are coupled to displacement transformers to provide indications of eccentricity and squareness as subsequently described. Further, a pickup stylus 31 is positioned to bear upon the face 32 and is secured to a pivoted arm 33. From the latter pickup device is obtained an indication of the parallelism of the faces of the ring.

Figure 3:
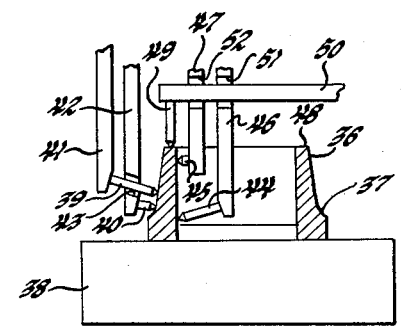

The pickup arrangement necessary to measure the same features of an inner ring of a ball bearing assembly is shown in FIGURE 3. An inner ring 36 having a ball race 37 is secured to a magnetic chuck 38 which corresponds to the chuck 13 of FIGURES 1 and 2. To detect race-to-face runout, a pair of pickup styli 39 and 40 are positioned to bear upon axially spaced points of this inner race 37. The styli 39 and 40 are secured to pivoted arms 41 and 42, respectively. The stylus 39 passes through an opening 43 of the arm 42. Bearing upon the inner diameter of the ring 36 at axially spaced points are a pair of pickup styli 44 and 45 which are secured to pivoted arms 46 and 47, respectively. Bearing upon a face 48, opposite the face which engages the chuck 38, is a pickup stylus 49 which is secured to a pivoted arm 50. The arm 50 passes through relieved portions 51 and 52 of the arms 46 and 47.

Figure 4:
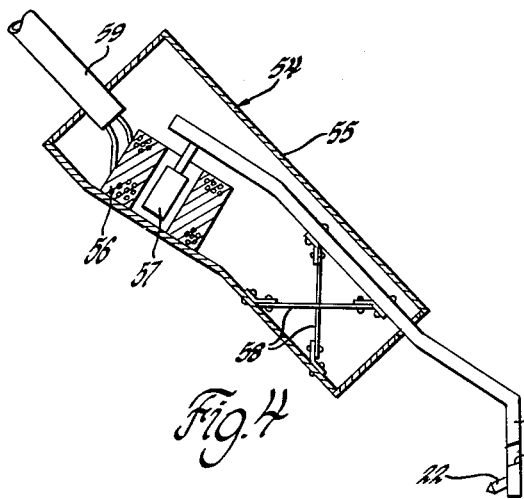
FIGURE 4 is a sectional view of one of the displacement pickups employed in the invention.

With reference to FIGURE 4, there is illustrated a pickup assembly 54 of the type utilized in conjunction with each of the pickup styli and pivoted arms referred to above. More particularly there is shown the pickup assembly utilized with the pickup stylus 22 and arm 24. The assembly includes a casing 55 to which is secured a linear variable differential transformer 56 having a movable core 57. The core 57 is secured to the arm 24 which is pivoted by suitable means such as a pair of cross springs 58. In this arrangement each spring has one end secured to the casing 55 and the other end secured to the arm 24. The leads of the transformer 56 are brought out through the casing 55 by a suitable electrical cable 59. It is seen that a line passing through the point of the stylus 22 and the pivot point of the arm 24 is perpendicular to the direction of movement of the stylus 22. Also, the core 57 moves perpendicular to a line drawn through the core center and the intersection of the crossed springs 58.

Figure 5:
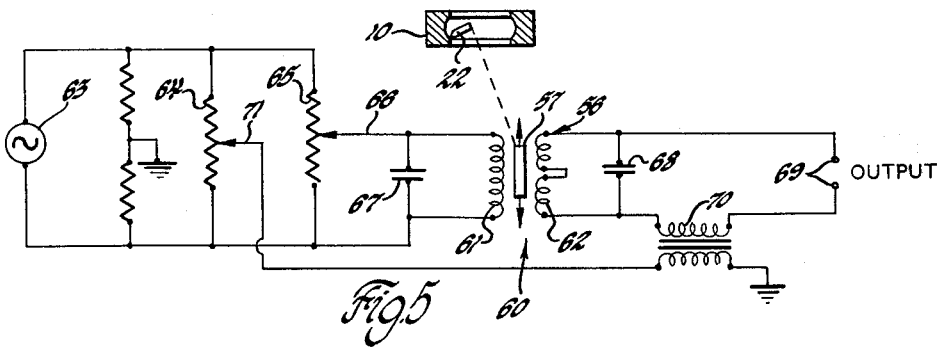
FIGURE 5 is a schematic diagram of the transformer circuit utilized with the pickup of FIGURE 4.

Referring now to FIGURE 5, there is shown a transformer circuit 60 of the type utilized with each of the pickup devices above and particularly with the differential transformer 56 in the pickup assembly 54 of FIGURE 4. The transformer 56 includes a primary 61 and a secondary 62. The primary is excited from an alternating voltage source 63 which has a frequency of approximately 2400 cycles. A pair of like resistors with a grounded juncture are connected across the source 63 to provide a balanced excitation voltage. A pair of potentiometers 64 and 65 are also connected across the source 63 and a tap 66 on the latter potentiometer is connected to one side of the primary 61, the other side being connected directly to the source. Thus the portion of the source voltage applied to the primary may be varied for calibration or sensitivity adjustment purposes. A capacitor 67 is connected across the primary 61 so that the primary circuit is broadly tuned to the source frequency. Likewise, a capacitor 68 is connected across the secondary 62 for tuning. The secondary is connected to a pair of output terminals 69 through a transformer 70. The primary of the transformer 70 is connected between ground and a tap 71 on the potentiometer 64. With this arrangement a component of the source frequency having variable amplitude and phase may be added in the secondary circuit to cancel out any voltage induced in the secondary 62 due to displacement of the core 57 when the stylus 22 is in its rest position. This provides zero calibration. The transformer circuit 60 produces an alternating voltage at the output terminals 69 that is quite linearly related to the displacement of the core 57 or stylus 22, the amplitude of this signal being determined by the magnitude of the displacement of the stylus 22, and the phase of this signal being determined by the direction of displacement.

Figure 6:
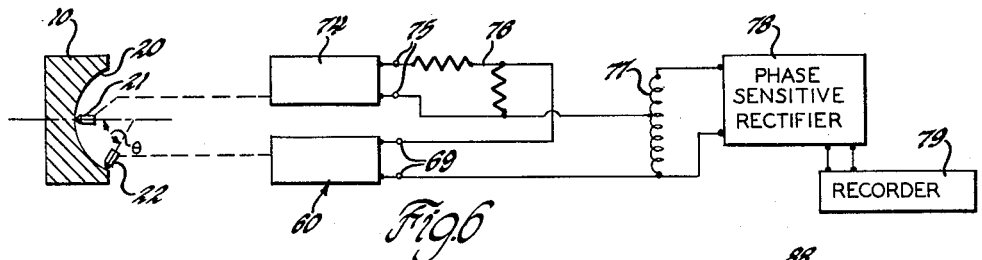
FIGURE 6 is a block diagram of an electrical circuit employed for one of the measurements performed by this invention.

With reference to FIGURE 6, a circuit is shown which is adapted to provide a reading or indication of race-to-face runout. The channel including stylus 21 bearing upon the center of the outer race 20, along with an associated transformer circuit 74 similar to the circuit 60 of FIGURE 5, provides an output signal at a pair of terminals 75 which is related to the linear displacement of the stylus 21. In a like manner the channel including the stylus 22, along with the transformer circuit 60, provides a signal at the terminals 69 related to displacement. It can be established that with two pickups arranged as the styli 21 and 22, the value of race-to-face runout will be proportional to a function $(A - B \cos \theta)/\sin \theta$, where B is the voltage produced at the terminals 75 due to displacement of the stylus 21, A is the voltage produced at the terminals 69 due to displacement at the stylus 22, and $\theta$ is the angle subscribed by the two styli. The signal at the terminals 75 is multiplied by a factor $(\cos \theta)$ by a voltage divider 76 and the output of this divider is combined in a subtractive relationship with the signal at the terminals 69. The combined signal is applied to a step-up transformer 77 which introduces the factor $(1/\sin \theta)$ and the output of this transformer is applied to a phase sensitive rectifier 78. This rectifier includes a reference input signal synchronized with the source 63 and produces a D.C. output having a magnitude corresponding to the amplitude of the A.C. input from the transformer 77 and having a polarity corresponding to the phase of the A.C. input. This D.C. output is connected to a suitable recorder 79 or other voltage-responsive indicating means. The difference between maximum and minimum output voltages from the rectifier 78 as the part is rotated provides an indication of race-to-face runout.

The circuit of FIGURE 6 is likewise used in conjunction with the styli 39 and 40 of FIGURE 3 to obtain an indication of race-to-face runout for an inner race. The expression $(A - B \cos \theta)/(\sin \theta)$ is valid for this measurement also.

Figure 7:
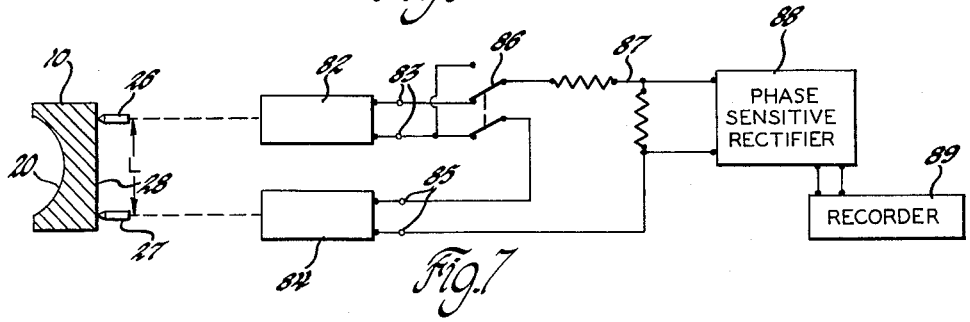
FIGURE 7 is a block diagram of an electrical circuit utilized to perform another of the measurements of this invention.

With reference to FIGURE 7, apparatus is shown for providing an output reading of eccentricity and of the amount which the outer diameter departs from perpendicularity with respect to the face. A transformer circuit 82 similar to that of FIGURE 5 is adapted ot produce a signal at a pair of output terminals 83 which is related to the magnitude of displacement of the pickup stylus 26. In a like manner a transformer circuit 84 similar to FIGURE 5 provides a signal at a pair of terminals 85 related to linear displacement of the stylus 27. A reversing switch 86, connected in circuit with the terminals 83, provides an output either in phase or out of phase with that produced by the circuit 82. The outputs from the switch 86 and from the terminals 85 are combined and applied across a voltage divider 87 which introduces a factor of one-half, or a factor of $(1/L)$, depending upon whether eccentricity or perpendicularity is being measured. By means of the reversing switch, the two signals at the terminals 83 and 85 may be combined in either an additive or a subtractive relationship. The output of the divider 87, if the signals from the terminals 83, 85 are added, will be related to eccentricity of the outer diameter with respect to the ball race. If the two signals are subtracted, the output of the divider 87 will be related to the amount which the outer diameter departs from a perpendicular position. That is, eccentricity will be represented by a function $(C+D)/2$, while perpendicularity will be represented by a function $(C-D)/L$, where C and D are the signals from pickups 26 and 27 respectively, and L is the axial displacement between the pickups. The output of the divider 87 is applied to a phase sensitive rectifier 88 of the type described above, and the D.C. output of this rectifier is applied to a recorder 89 or other voltage-responsive means.

In a like manner, the circuit of FIGURE 7 may be employed along with the styli 44 and 45 of FIGURE 3 to obtain an indication of the eccentricity of the inner diameter of the inner ring. Also, this circuit provides an indication of the amount which the inner diameter departs a perpendicular position.

To provide a direct reading of the out-of-parallelism of the two faces of a bearing ring, then the stylus 31 is utilized along with a transformer circuit similar to FIGURE 5 and the transformer output is coupled to a phase sensitive rectifier. The output of the rectifier is then a D.C. voltage which is directly related to the amount which one face departs from a plane parallel to the face which engages the chuck 13.

Figure 8:
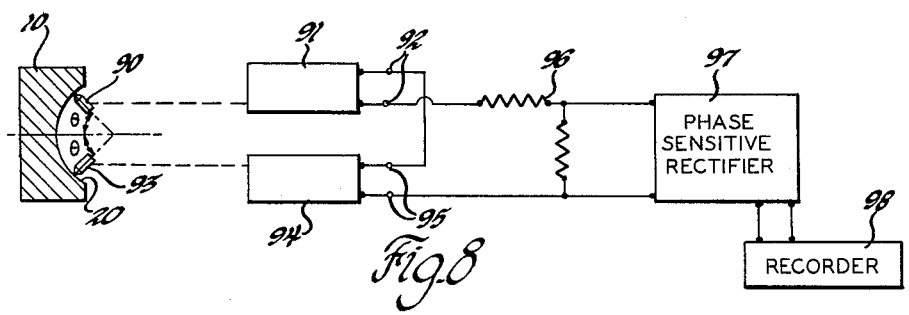
FIGURE 8 is a block diagram of a modification of the apparatus of FIGURE 6.

An alternate arrangement for obtaining a reading of race-to-face runout is illustrated in FIGURE 8. Here is a first pickup channel including a stylus 90 along with a transformer circuit 91 produces an output at a pair of terminals 92 which is related to the linear displacement of the stylus as the part rotates. The center line of the stylus 90 is displaced by an angle $\theta$ with respect to the axis of symmetry of the ball race 20. Likewise, a second pickup channel includes a stylus 93 positioned to bear upon the race 20 at a point equally displaced from the axis of symmetry by an angle $\theta$. The stylus 93 is coupled to a transformer circuit 94 which produces a voltage at a pair of terminals 95 related to linear displacement of the stylus. It can be established that, with this arrangement, the value of race-to-face runout is related to the mathematical expression $(A' - B') \sin \theta$ where A' is the output at the terminals 92 and B' is the output at the terminals 95. The output terminals 92, 95 are connected together in a subtractive arrangement to provide the factor $(A' - B')$. The factor $(\sin \theta)$ is introduced by a voltage divider 96 and the output of this divider is connected to a phase sensitive rectifier 97 and a recorder 98 such as described above. It is seen that if the part is merely off-center, the factors A' and B' will be equal and thus will cancel. This arrangement cannot be used for race-to-face measurements on the inner ring shown in FIGURE 3 since the inner race includes only a portion of one quadrant of a circle. However, this arrangement is operative for inner ring measurements if the inner race includes both shoulders.

In the operation of the measurement systems described above, the part under test is rotated at a slow speed, such as 4 r.p.m., by the chuck and spindle arrangement of FIGURE 1. The necessary pickups are positioned to bear upon the part as illustrated in FIGURES 2 and 3. Each pickup, being associated with a circuit such as shown in FIGURE 5, produces a high-frequency signal related in amplitude to the magnitude of the stylus displacement and related in phase to the direction of displacement. Selected signals are combined by one of the circuits of FIGURES 6, 7, or 8, thus providing a D.C. output related to race-to-face runout, eccentricity, or perpendicularity. This output will vary as the part rotates, and the actual value of the feature being measured will be represented by the peak-to-peak departure of this output. The recording or indicating apparatus may be calibrated in microinches, for example.

While this invention has been described in terms of illustrative embodiments, it is of course understood that the invention is not limited thereto. Various modifications may be apparent to persons skilled in the art and so it is contemplated that the appended claims will cover any such modifications as fall within the true scope of the invention.

I claim:

1. Testing apparatus comprising drive means adapted to receive a race ring of a ball bearing for rotating said ring about its center, first and second displacement pickups positioned to bear upon a pair of spaced points on the ball race of said ring, said points lying in a plane passing through the axis of the ring and being axially spaced with respect to said ring, said pickups being adapted to generate first and second signals in accordance with displacement of said points, a translating circuit connected to said first and second pickups and adapted to produce an output related to the magnitude of said first and second signals by a function of the spacing of said pickups, and indicating means connected to said translating circuit to receive said output.

2. In testing apparatus, drive means for rotating a ball bearing ring about its center, a first displacement pickup positioned to bear upon the center of the ball race of said ring and adapted to generate a first signal related to displacement thereof, a second displacement pickup positioned to bear upon a position on said ball race axially displaced from said center and adapted to generate a second signal related to displacement thereof, said pickups contacting the race at points lying in a plane passing through the axis of the ring, a translating circuit connected to said pickups to receive said first and second signals and adapted to produce an output signal related to the magnitudes of said first and second signals by a function of the axial spacing between said first and second pickups, and indicating means connected to said translating circuit to receive said output signal.

3. Testing apparatus comprising drive means adapted to receive a race ring of a ball bearing for rotating said ring about its axis, a first displacement pickup positioned to bear upon the center of the ball race of said ring and adapted to generate a first signal related to displacement, a second displacement pickup positioned to bear upon a point on said ball race axially spaced with respect to said ring and arcuately spaced with respect to said race, said second pickup being adapted to generate a second signal related to displacement at said point, said pickups contacting the race at points lying in a plane passing through the axis of the ring, translating means connected to said first pickup and adapted to provide a third signal related by a function of said arcuate displacement to said first signal, combining means connected to said second pickup and said translating means and adapted to produce an output signal related to the difference between said second and third signals, and indicating means connected to receive said output signal.

4. Testing apparatus comprising drive means adapted to receive a cylindrical part for rotating said part about its center, first and second displacement pickups positioned to bear upon axially spaced points on the surface of said part, said pickups being adapted to generate first and second signals related to displacement at said points, a combining circuit connected to said pickups to receive said first and second signals and adapted to produce a third signal related thereto, switching means connected in said combining circuit and adapted to provide a selection between an additive and a subtractive relationship of said first and second signals whereby both eccentricity and wobble of said part may be detected, and indicating means connected to said combining means to receive said third signal.

5. In testing apparatus for providing an indication of race-to-face runout of the race ring of a ball bearing, drive means adapted to receive said race ring for rotating said ring about its axis, a first displacement pickup positioned to bear upon the center of the ball race of said ring and adapted to generate a first signal related to displacement, a second displacement pickup positioned to bear upon a point on said ball race in a plane defined by the axis of the ring and the point of contact of the first pickup with the race and displaced from the first pickup along the ball race by an angle θ, said second pickup being adapted to generate a second signal related to displacement at said point, translating means connected to said first pickup to receive said first signal and adapted to produce a third signal related to the product of said first signal and a function of said angle θ, combining means connected to said second pickup and said translating circuit to receive said second and third signals and adapted to produce an output signal related by a function of said angle θ to the difference between said second and third signals, and race-to-face runout indicating means connected to said combining means to receive said output signal and indicate the magnitude thereof.

References Cited in the file of this patent

UNITED STATES PATENTS

| | | |
|---|---|---|
| 2,370,503 | Straw | Feb. 27, 1945 |
| 2,371,451 | Larson | Mar. 13, 1945 |
| 2,687,038 | Aller | Aug. 24, 1954 |
| 2,863,222 | Comstock | Dec. 9, 1958 |
| 2,983,141 | Vanator | May 9, 1961 |
| 2,969,598 | Voltaire | Jan. 31, 1961 |

FOREIGN PATENTS

| | | |
|---|---|---|
| 630,173 | Germany | May 22, 1936 |